(12) United States Patent
Baptist et al.

(10) Patent No.: US 10,416,906 B2
(45) Date of Patent: Sep. 17, 2019

(54) REBALANCING EFFICIENCY WITH OPTIMAL LOGICAL INSERTION LOCATIONS

(71) Applicant: International Business Machines Corporation, Armonk, NY (US)

(72) Inventors: Andrew D. Baptist, Mt. Pleasant, WI (US); Ravi V. Khadiwala, Bartlett, IL (US); Manish Motwani, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 15/467,754

(22) Filed: Mar. 23, 2017

(65) Prior Publication Data

US 2017/0289250 A1 Oct. 5, 2017

Related U.S. Application Data

(60) Provisional application No. 62/314,792, filed on Mar. 29, 2016.

(51) Int. Cl.
*G06F 12/00* (2006.01)
*G06F 3/06* (2006.01)
(Continued)

(52) U.S. Cl.
CPC ............ *G06F 3/0619* (2013.01); *G06F 3/061* (2013.01); *G06F 3/0604* (2013.01); *G06F 3/064* (2013.01);
(Continued)

(58) Field of Classification Search
CPC .. G06F 11/1076; G06F 11/1092; G06F 3/061; G06F 3/0631; G06F 3/064; G06F 3/0644; G06F 3/067; H04L 67/1097
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Mardochee Chery
(74) *Attorney, Agent, or Firm* — Garlick & Markison; Timothy W. Markison; Timothy D. Taylor

(57) ABSTRACT

A method includes determining, by a managing unit of a dispersed storage network (DSN), an addition of a new storage unit to a group of storage units. The DSN includes a logical address space divided into a set of logical address sub-spaces, one of which is allocated to the group of storage units. The method further includes reorganizing, by the managing unit, distribution of the logical address sub-space among the new storage unit and each storage unit in the group of storage units to produce a reorganized logical address sub-space. The allocation includes the new storage unit's portion being between portions of first and second storage units. The method further includes transferring, by the first storage unit, a first group of encoded data slices to the new storage unit and transferring, by the second storage unit, a second group of encoded data slices to the new storage unit.

16 Claims, 10 Drawing Sheets

(51) Int. Cl.

| | | |
|---|---|---|
| *G06F 11/10* | (2006.01) | |
| *G06F 8/65* | (2018.01) | |
| *G06F 9/48* | (2006.01) | |
| *H04L 29/08* | (2006.01) | |
| *H03M 13/05* | (2006.01) | |
| *G06F 21/31* | (2013.01) | |
| *H04L 29/06* | (2006.01) | |
| *H04L 29/12* | (2006.01) | |
| *H03M 13/15* | (2006.01) | |
| *H03M 13/00* | (2006.01) | |
| *H03M 13/37* | (2006.01) | |

(52) U.S. Cl.
CPC .......... *G06F 3/067* (2013.01); *G06F 3/0611* (2013.01); *G06F 3/0631* (2013.01); *G06F 3/0635* (2013.01); *G06F 3/0644* (2013.01); *G06F 3/0647* (2013.01); *G06F 3/0659* (2013.01); *G06F 8/65* (2013.01); *G06F 9/485* (2013.01); *G06F 9/4881* (2013.01); *G06F 11/1076* (2013.01); *G06F 11/1092* (2013.01); *G06F 21/31* (2013.01); *H03M 13/05* (2013.01); *H04L 61/10* (2013.01); *H04L 61/20* (2013.01); *H04L 63/08* (2013.01); *H04L 63/104* (2013.01); *H04L 63/108* (2013.01); *H04L 67/1097* (2013.01); *H04L 67/28* (2013.01); *G06F 2221/2133* (2013.01); *H03M 13/1515* (2013.01); *H03M 13/373* (2013.01); *H03M 13/616* (2013.01)

(58) Field of Classification Search
USPC ........................................................ 711/170
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

(56) References Cited

OTHER PUBLICATIONS

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

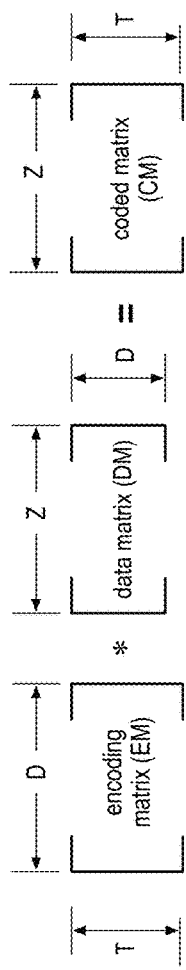

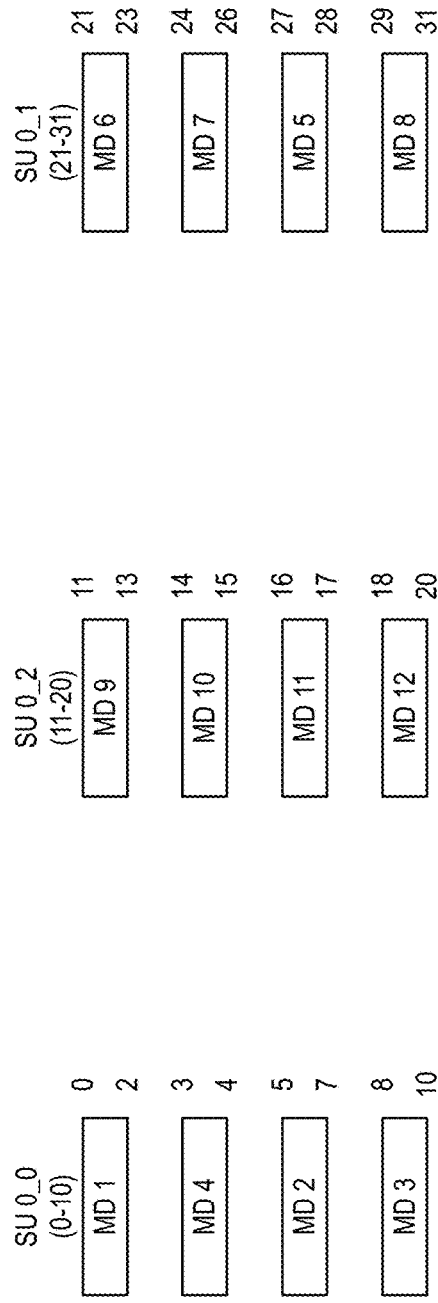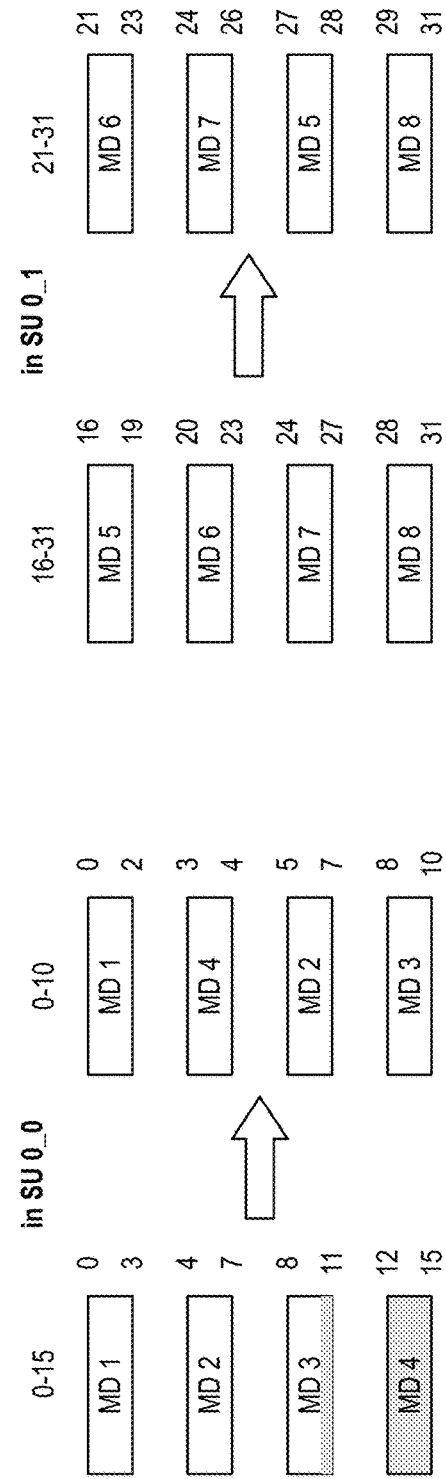
FIG. 13
FIG. 14
FIG. 15

REBALANCING EFFICIENCY WITH OPTIMAL LOGICAL INSERTION LOCATIONS

CROSS REFERENCE TO RELATED PATENTS

The present U.S. Utility Patent Application claims priority pursuant to 35 U.S.C. § 119(e) to U.S. Provisional Application No. 62/314,792, entitled "SELECTING A PROCESSING UNIT IN A DISPERSED STORAGE NETWORK," filed Mar. 29, 2016, which is incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

To expand a dispersed storage system, new storage units are added. For example, in a system that utilizes an error encoding of n=16 and k=10 (where n is the pillar width and k is the decode threshold) it may start out with 16 Storage units. At some point in time, another 16 storage units are added to the system. In accordance with the addressing scheme employed by the system, some of the data stored in the original 16 storage units will be transferred to the new 16 storage units.

BRIEF DESCRIPTION OF THE SEVERAL VIEWS OF THE DRAWING(S)

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 13 is a schematic block diagram of another example of a portion of DSN logical address space allocated to three storage units in accordance with the present invention;

FIG. 14 is a schematic block diagram of an example of a logical address space remapping by a storage unit in accordance with the present invention;

FIG. 15 is a schematic block diagram of an example of a logical address space remapping by a storage unit in accordance with the present invention;

DETAILED DESCRIPTION OF THE INVENTION

Figure 1:
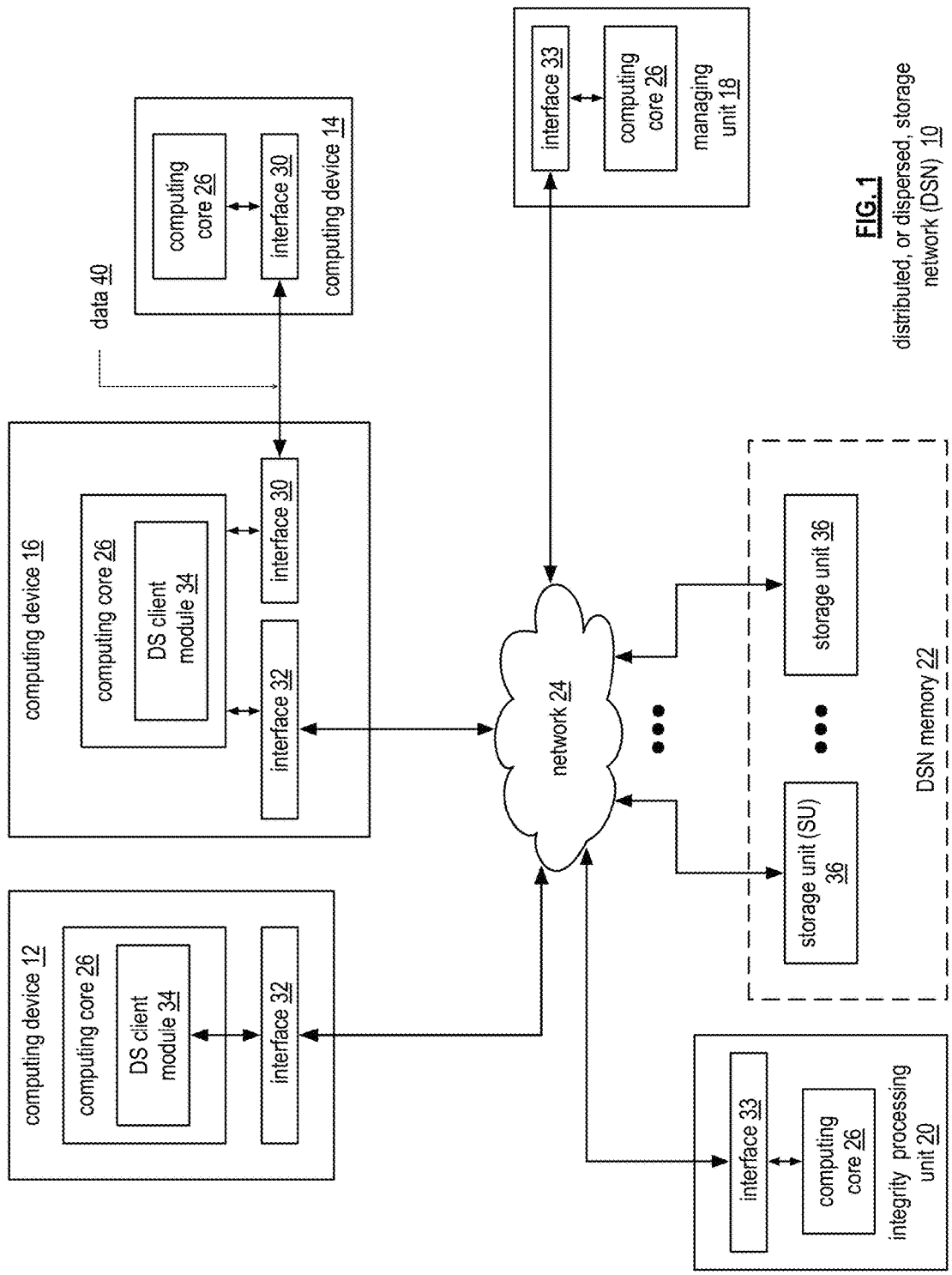
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
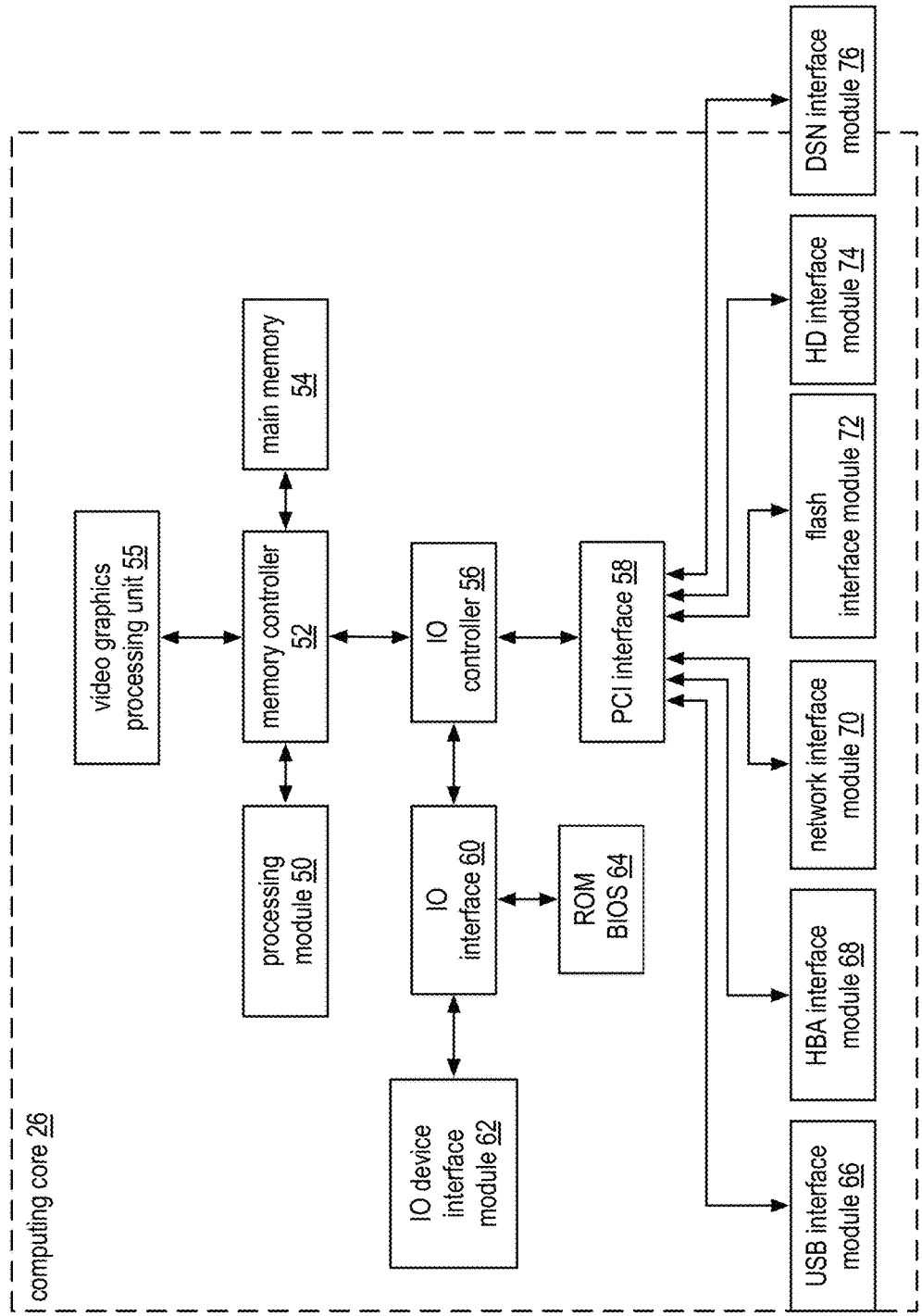
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figure 3:
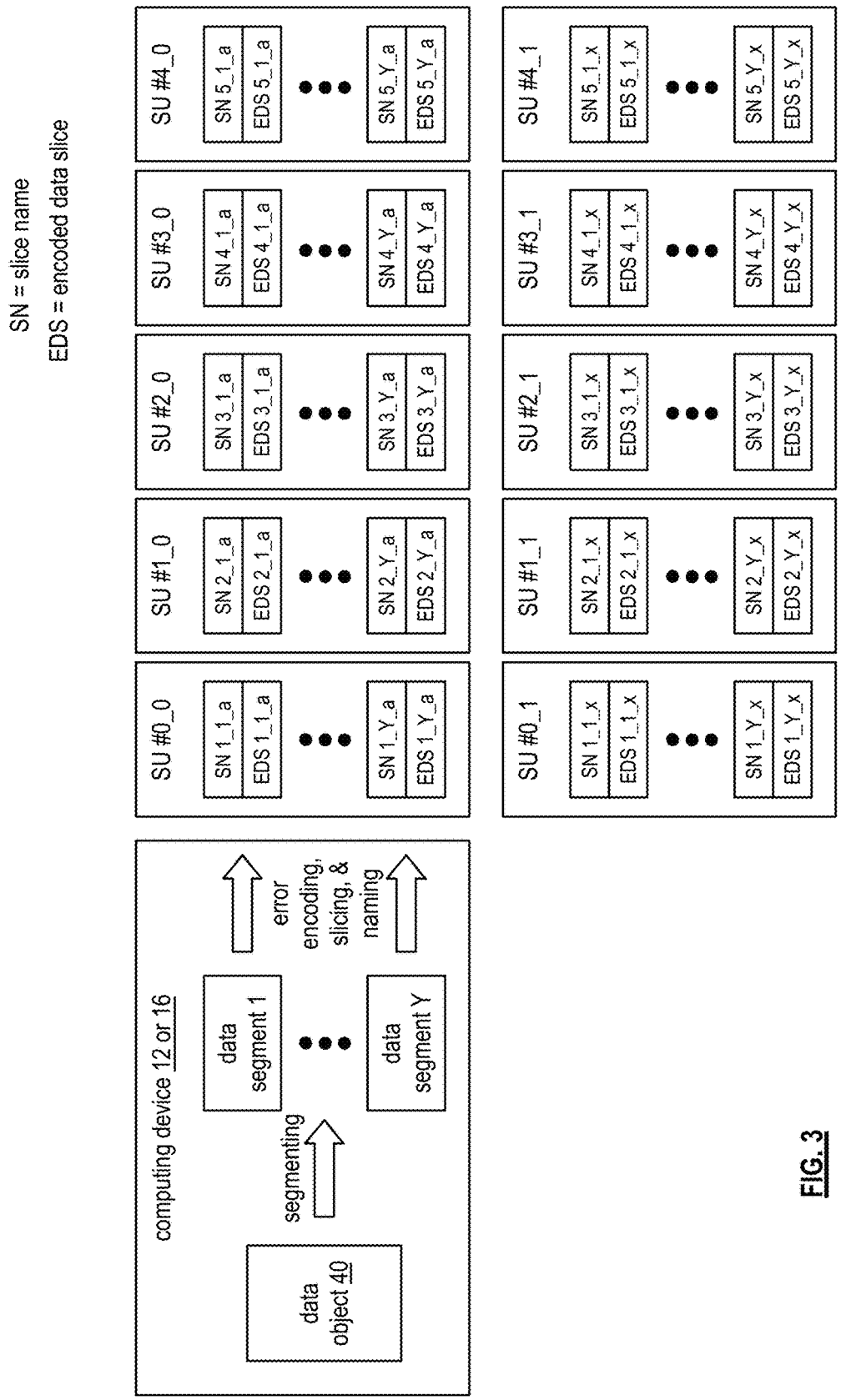
FIG. 3 is a schematic block diagram of an example of dispersed storage error encoding of data in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent on the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. In this example, the DSN memory includes five groupings of storage units; one grouping of storage units for each pillar number. As such, storage units #0_0 and #0_1 are associated with pillar number #1 and storage the first encoded data slices of sets of encoded data slices (e.g., EDS 1_1_a through EDS 1_Y_a; EDS 1_1_x through EDS 1_Y_x; etc.). Storage units #1_0 and #1_1 are associated with pillar number #2 and storage the second encoded data slices of sets of encoded data slices (e.g., EDS 2_1_a through EDS 2_Y_a; EDS 2_1_x through EDS 2_Y_x; etc.); and so on.

Figure 7:
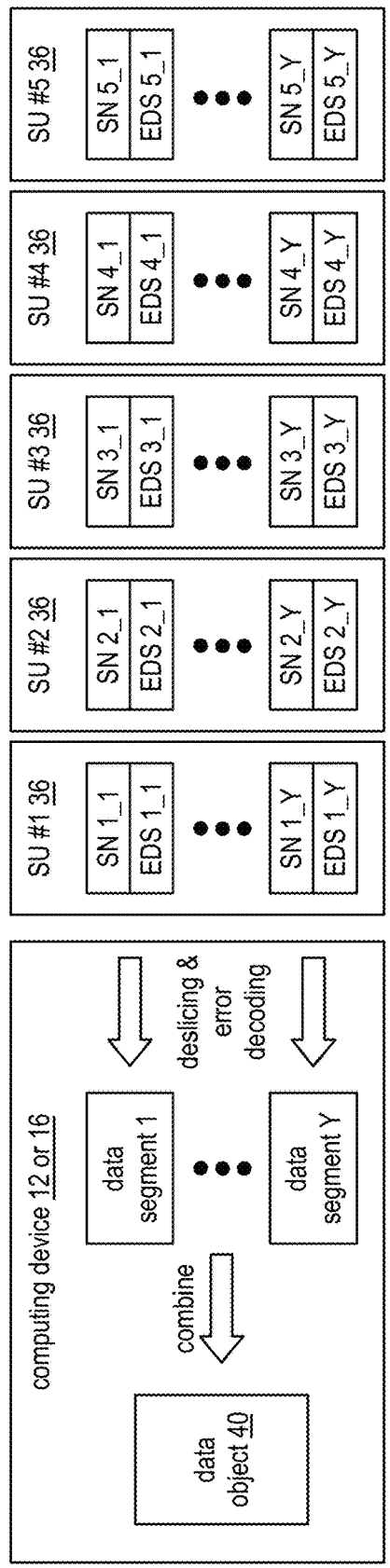
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
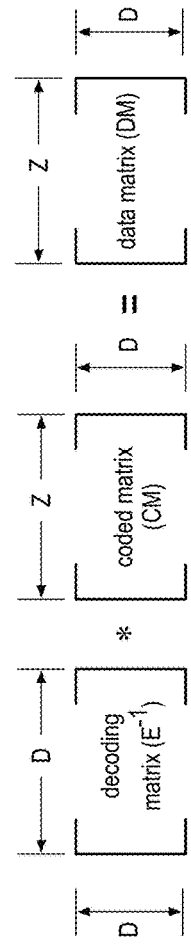
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
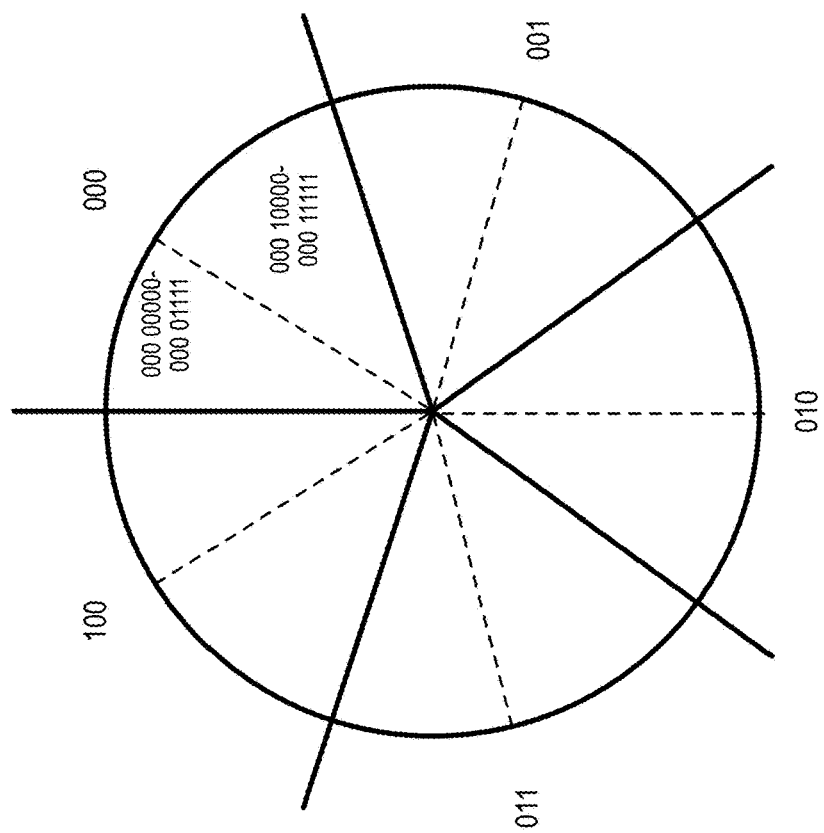
FIG. 9 is a diagram of an example of logical address space of a DSN in accordance with the present invention.

FIG. 9 is a diagram of an example of logical address space of a DSN with five groups of storage units (e.g., a pillar width of five) and a group of storage units includes two storage units. The logical address space is divided into five main sections having most significant bits of 000, 001, 010, 011, and 100 (e.g., in decimal, 0-4). Main section 000 is divided into two sections: 000 00000 through 000 01111 (e.g., 000-015 in decimal) and 000 10000 through 000 11111 (e.g., 016-031 in decimal). With two storage units in the group (e.g., storage unit #0_0 and #0_1), storage unit #0_0 is allocated the first section (000-015) and storage unit #0_1 is allocated the second section (016-031).

Each of the other main sections may be equally subdivided. For example, main section 001 is divided into two sections: 001 00000 through 001 01111 (e.g., 100-115 in decimal) and 001 10000 through 001 11111 (e.g., 116-131 in decimal). With two storage units in the group (e.g., storage unit #1_0 and #1_1), storage unit #1_0 is allocated the first section (100-115) and storage unit #1_1 is allocated the second section (116-131). As another example, main section 010 is divided into two sections: 010 00000 through 010 01111 (e.g., 200-215 in decimal) and 010 10000 through 010 11111 (e.g., 216-231 in decimal). With two storage units in the group (e.g., storage unit #2_0 and #2_1), storage unit #2_0 is allocated the first section (200-215) and storage unit #2_1 is allocated the second section (216-231).

In this example, only the most significant bits of the main section and the first level partitioning are shown. The overall logical address space spans tens of terabytes of data or more. As such, the logical address for data within the DSN (e.g., the slice name for an encoded data slice) is many bytes in length (e.g., a few bytes to tens of kilobytes).

Figure 10:
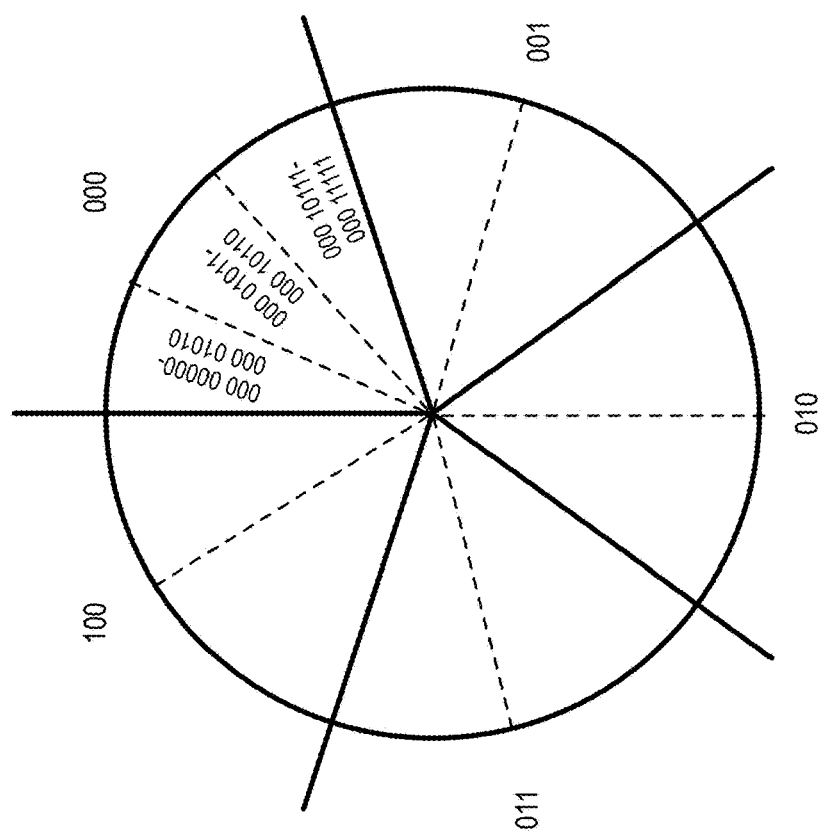
FIG. 10 is a diagram of another example of logical address space of a DSN in accordance with the present invention.

FIG. 10 is a diagram of another example of logical address space of a DSN when a storage unit is added to a group of storage units. In particular, storage unit #0_2 is added to pillar #1 storage unit group, which now includes storage units #0_0, #0_1, and #0_2. In this example, the storage capabilities of each storage unit are the group is approximately equal. As such, the main memory section of 000 is divided into three approximately equal sized subsections. When the storage capabilities of the storage units are not approximately equal, then the main memory section 000 will be divided proportionally among the storage units based on their respective storage capabilities (e.g., if one storage unit has twice the storage capability of another, it will be allocated twice as much of the main memory section).

With approximately equal storage capabilities, the main memory section 000 is divided into three sub-sections 000 00000-000 01010 (000-010 in decimal); 000 01011-000 10110 (011-020 in decimal); and 000 10111-000 11111 (021-031 in decimal). To efficiently transfer data as a result of the addition of a storage unit, the new storage unit is allocated the middle sub-section logical memory space. For example, new storage unit #0_2 is allocated sub-section 000 01011-000 10110 (011-020 in decimal). Storage unit #0_0 is allocated sub-section 000 00000 000 01010 (000-010 in decimal) and storage unit #0_1 is allocated sub-section 000 10111-000 11111 (021-031 in decimal).

Figure 11:
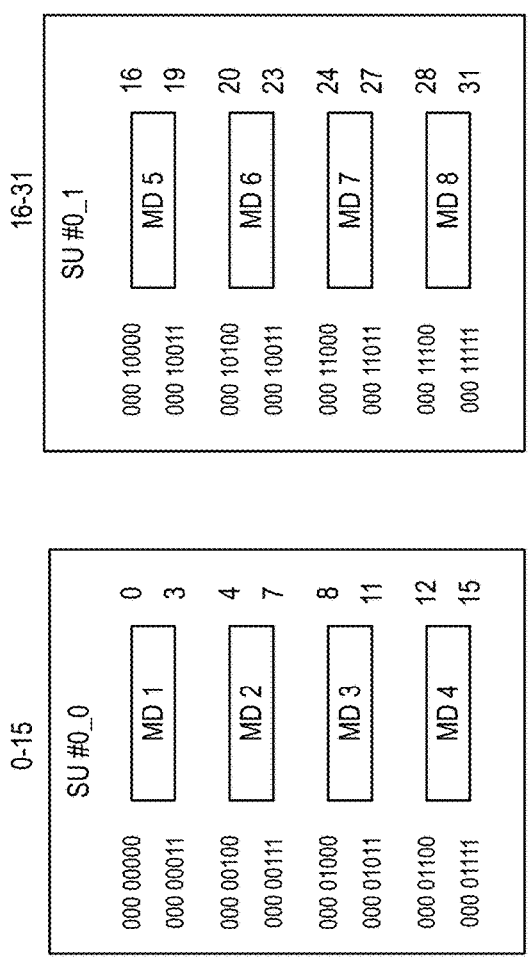
FIG. 11 is a schematic block diagram of an example of a portion of DSN logical address space allocated to two storage units in accordance with the present invention.

FIG. 11 is a schematic block diagram of an example of a portion of DSN logical address space allocated to two storage units: SU #0_0 and SU #0_1. In this example, each storage unit includes four memory devices. Storage unit #0_0 includes memory devices (MD) 1-4 and storage unit #0_1 includes memory devices (MD) 5-8. Assuming that each memory device has approximately the same storage capabilities (e.g., capacity, speed, throughput, etc.), the storage unit divides its respective sub-section of the main section logical address space approximately equal among the memory devices.

For example, memory device 1 of storage unit #0_0 is allocated logical address space with the MSBs (most significant bits) of 000 00000 through 000 00011 (000-003 in decimal), memory device 2 is allocated logical address space with the MSBs of 000 00100 through 000 00111 (004-007 in decimal), memory device 3 is allocated logical address space with the MSBs of 000 01000 through 000 01011 (008-011 in decimal), and memory device 2 is allocated logical address space with the MSBs of 000 01100 through 000 01111 (012-015 in decimal). As another example, memory device 5 of storage unit #0_1 is allocated logical address space with the MSBs (most significant bits) of 000 10000 through 000 10011 (016-019 in decimal), memory device 6 is allocated logical address space with the MSBs of 000 10100 through 000 10111 (020-023 in decimal), memory device 7 is allocated logical address space with the MSBs of 000 11000 through 000 11011 (024-027 in decimal), and memory device 8 is allocated logical address space with the MSBs of 000 11100 through 000 11111 (028-031 in decimal).

Figure 12:
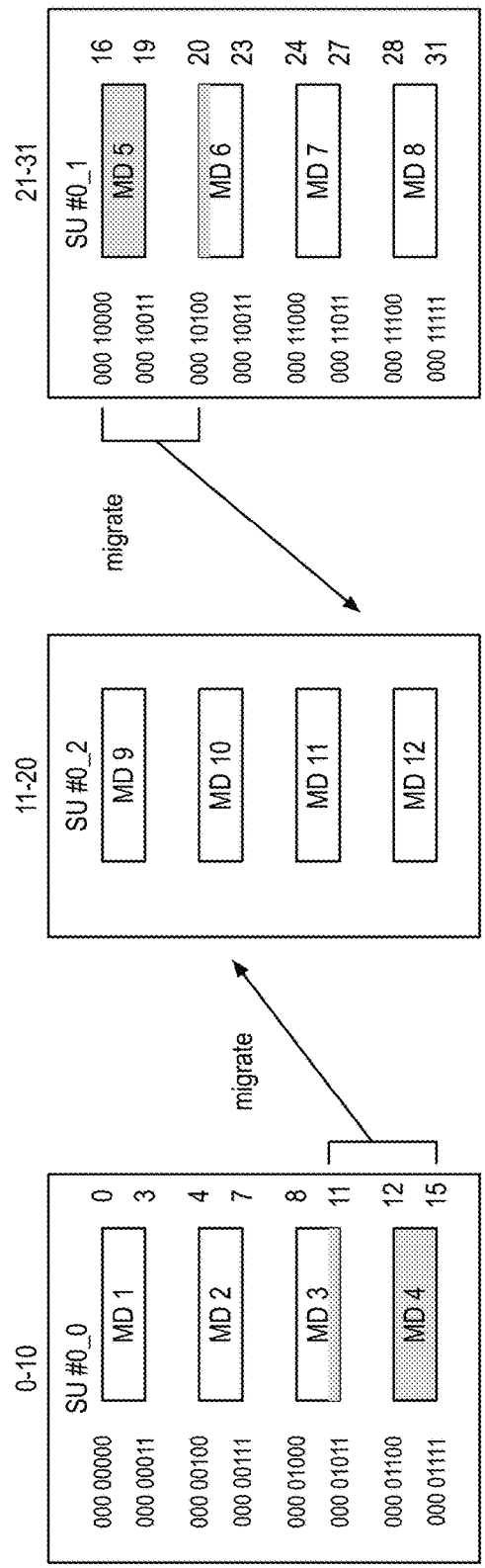
FIG. 12 is a schematic block diagram of an example of a portion of DSN logical address space allocated to three storage units in accordance with the present invention.

FIG. 12 is a schematic block diagram of an example of a portion of DSN logical address space allocated when a third storage unit is added to a group of two storage units. As mentioned with reference to FIG. 10, when storage unit #0_2 is added, it is allocated a sub-section of main logical address space section 000 that is approximately in the middle of the main logical address space section 000. In particular, new storage unit #0_2 is allocated sub-section 11-20 (in decimal) of main logical address space section 000. Accordingly, storage unit #0_0 allocation is changed from 0-15 (decimal) to 0-20 (decimal) of main logical address space section 000 and storage unit #0_1 allocation is changed from 16-31 (decimal) to 21-31 (decimal) of the main logical address space section 000.

Continuing with the example, storage unit #0_0 will transfer all data (e.g., encoded data slices) having slice names (e.g., DSN logical addresses) with MSBs in the range of 000 01011 to 000 01111 (011-015 in decimal) to storage unit #0_2. Similarly, storage unit $0_1 will transfer all data have DSN logical addresses with MSBs in the range of 000 10000 to 000 10100 (016-020 in decimal) to storage unit #0_2. With the logical address space allocation to the memory devices within the storage units, all of the data on memory device #4 of storage unit #0_0 will be transferred to storage unit #0_2. Similarly, all of the data on memory device #5 of storage unit #0_1 will be transferred to storage unit #0_2. Only some data from memory device #3 of storage unit #0_0 and memory device #6 of storage unit #0_1 will be transferred to storage unit #0_2. No data from the other memory devices (e.g., 1, 2, 7, and 8) will be transferred to storage unit #0_2.

FIG. 13 is a schematic block diagram of another example of a portion of DSN logical address space allocated to three storage units and their corresponding memory devices. With storage units #0_0 and #0_1, the allocation of the logical address space is redistributed among the memory devices. For efficient redistribution, the memory device(s) that are emptied due to the transfer (e.g., memory device #4 of SU #0_0 and memory device #5 of SU #0_1) are logically repositioned between the two other memory devices that did not transfer any data as a result of the addition of a new storage unit. As such, memory device #4 is positioned between memory device #1 and memory device #2 of storage unit #0_0 and memory device #5 is positioned between memory devices #7 and #8 of storage unit #0_1.

For storage unit #0_0, the logical address section (0-10 decimal) of the main logical address space section 000 is divided among the memory devices. For example, MD #1 has addresses with MSBs in the main logical address space section 000 in the range between 0 and 2 (decimal), MD #4 has addresses with MSBs in the main section 000 in the range of 3-4 (decimal), MD #2 has addresses with MSBS in the main section 000 in the range of 5-7 (decimal), and MD #3 has addresses with MSBS in the main section 000 in the range of 8-10 (decimal).

For storage unit #0_1, the logical address section (21-31 decimal) of the main logical address space section 000 is divided among the memory devices. For example, MD #6 has addresses with MSBs in the main section 000 in the range between 21 and 23 (decimal), MD #7 has addresses with MSBs in the main section 000 in the range of 24 and 26 (decimal), MD #5 has addresses with MSBS in the main section 000 in the range of 27-28 (decimal), and MD #8 has addresses with MSBS in the main section 000 in the range of 29-31 (decimal).

For new storage unit #0_2, the logical address section (21-31 decimal) of the main logical address space section 000 is divided among the memory devices (MD #9-MD #12). For example, MD #9 has addresses with MSBs in the main section 000 in the range between 11-13 (decimal), MD #10 has addresses with MSBs in the main section 000 in the range of 14-15 (decimal), MD #11 has addresses with MSBS in the main section 000 in the range of 16-17 (decimal), and MD #12 has addresses with MSBS in the main section 000 in the range of 18-20 (decimal).

FIG. 14 is a schematic block diagram of an example of a logical address space remapping by storage unit #0_0. In this example, memory device #1 keeps data with logical addresses with MSBs of 0-2 (decimal) in the main logical address space section 000 and transfers data with logical addresses with MSBs of 3 (decimal) in the main section 000 to memory device #4. Memory device #2 keeps data with logical addresses with MSBs of 5-7 (decimal) in the main section 000 and transfers data with logical addresses with MSBs of 4 (decimal) in the main section 000 to memory device #4. Memory device #3 keeps data with logical addresses with MSBs of 8-10 (decimal) in the main section 000. Note that memory device #3 transferred data with logical addresses with MSBs of 11 (decimal) in the main section 000 to storage unit #0_2.

FIG. 15 is a schematic block diagram of an example of a logical address space remapping by storage unit #0_1. In this example, memory device # keeps data with logical addresses with MSBs of 29-31 (decimal) in the main logical address space section 000 and transfers data with logical addresses with MSBs of 28 (decimal) in the main section 000 to memory device #5. Memory device #7 keeps data with logical addresses with MSBs of 24-26 (decimal) in the main section 000 and transfers data with logical addresses with MSBs of 28 (decimal) in the main section 000 to memory device #5. Memory device #6 keeps data with logical addresses with MSBs of 21-23 (decimal) in the main section 000. Note that memory device #6 transferred data with logical addresses with MSBs of 20 (decimal) in the main section 000 to storage unit #0_2.

Figure 16:
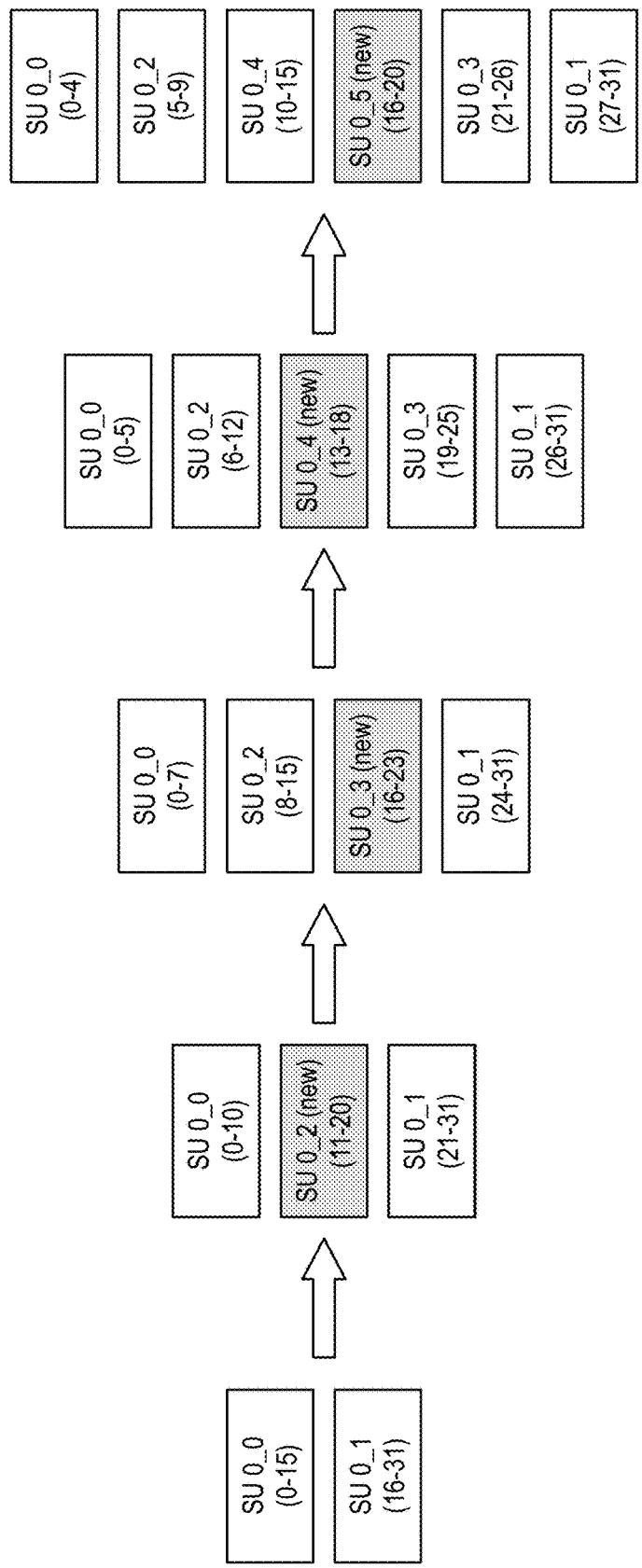
FIG. 16 is a schematic block diagram of an example of multiple additions of storage units and corresponding logical address space remapping in accordance with the present invention.

FIG. 16 is a schematic block diagram of an example of multiple additions of storage units and corresponding logical address space remapping. At a given point in time, a group of storage units included two storage units (SU 0_0 and SU 0_1) and is allocated main logical address space section 000. Accordingly, SU 0_0 was allocated logical addresses with MSBs of 0-15 (decimal) in the main section 000 and SU 0_1 was allocated logical address with MSBs of 16-31 (decimal) in the main section 000.

At some point later in time, a third storage unit (SU 0_2) is added to the group and main section 000 is divided into three sections (0-10, 11-20, and 21-31, decimal). The new storage unit SU 0_2 is logically added in the middle of the main section 000 as has been previously discussed. At another point in time, a fourth storage unit SU 0_3 is added to the group and the main section 000 is divided into four sections (e.g., 0-7, 8-15, 16-23, and 24-31, decimal). The new storage unit 0_3 is logically added between SU 0_2 and SU 0_1. Alternatively, it could have been added between SU 0_0 and SU 0_2. The transferring of data between the storage units occurs in a manner as previously discussed. Similarly, redistributing logical addresses among memory devices within the storage units occurs in a manner as previously discussed.

The example of FIG. 16 continues by adding a fifth storage unit SU 0_4 and then a sixth storage unit SU 0_5. Each storage unit that is added, it is logically added between two existing storage units such that data transfer can occur between storage units in a manner as previously discussed. Further, logical addresses within the storage units can be redistributed as previously discussed.

Figure 17:
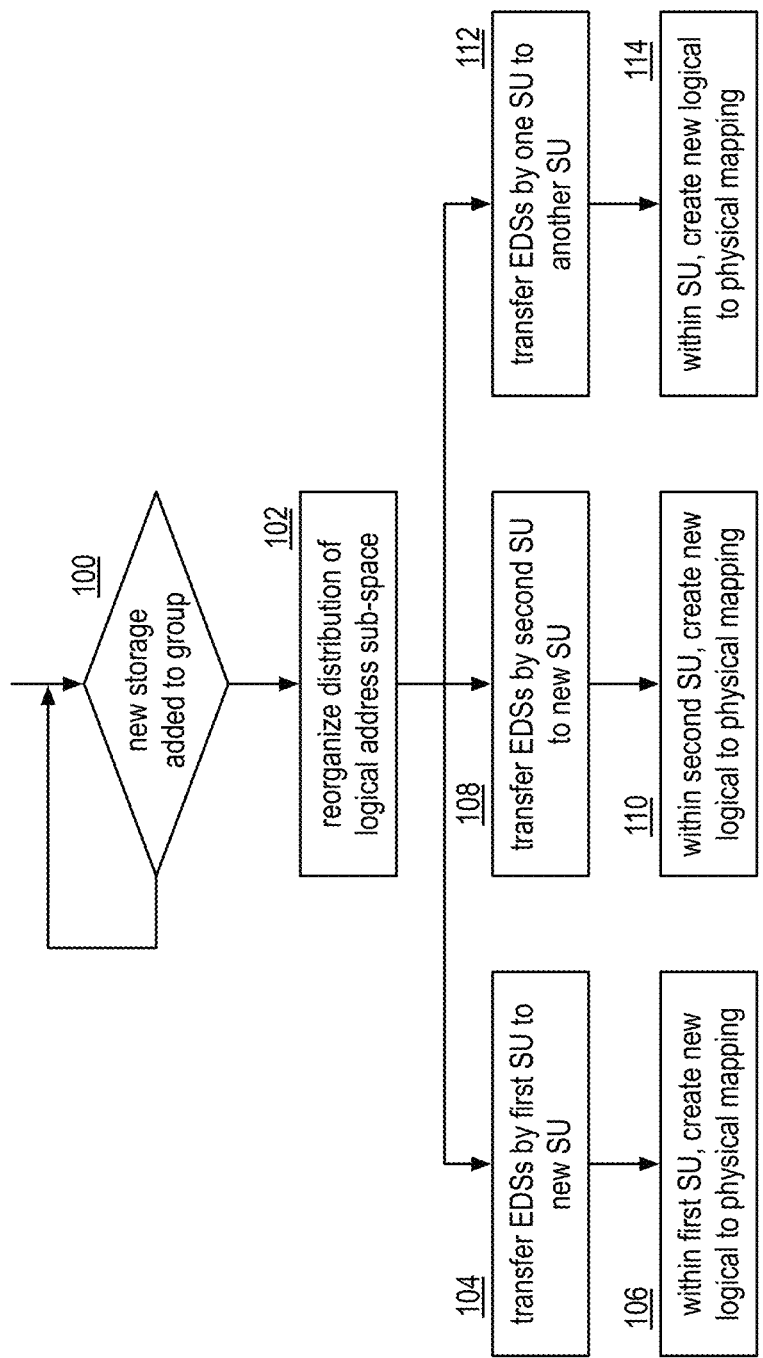
FIG. 17 is a logic diagram of an example of a method of logical address space remapping in a DSN in accordance with the present invention.

FIG. 17 is a logic diagram of an example of a method of logical address space remapping in a DSN that begins at step 100 with a managing unit determining an addition of a new storage unit to a group of storage units. This may be done in a variety of ways. For example, the managing unit receives a notice of the new storage unit. As another example, the managing unit determines the addition of the new storage unit when it attempts to register with the managing unit.

The method continues at step 102 where the managing unit reorganizing distribution of the logical address sub-space among the new storage unit and each storage unit in the group of storage units to produce a reorganized logical address sub-space. In an example, the managing unit allocates a first portion of the logical address sub-space to the new storage unit, wherein the first portion is between second and third portions of the logical address sub-space. The second portion is allocated to a first storage unit of the group and the third portion is allocated to a second storage units of the group. Examples of this were discussed with reference to one or more of FIGS. 9-16.

The method continues at steps 104, 106, and 108. At step 104, the first storage unit transfers a first group of encoded data slices to the new storage unit in accordance with the reorganized logical address sub-space. For example, the first storage unit determines logical DSN addresses of a previous portion of the logical address sub-space that was allocated to the first storage unit that are being reallocated to the new storage unit based on a difference between the second portion of the logical address sub-space and the previous portion of the logical address sub-space. The first storage unit identifies the first group of encoded data slices as encoded data slices having slice names that correspond to the logical DSN addresses that are being reallocated. In an embodiment, the first storage unit identifies the first group of encoded data slices by accessing a previous logical-to-physical storage mapping of memory devices and, in accordance with that mapping, identifies the memory devices storing the encoded data slices. For example, and with reference to FIG. 12 and, storage unit #0_0 transfers encoded data slices having slice names (e.g., DSN addresses) with MSBs of 000 01011 to 000 01111 to new storage unit #0_2, where the encoded data slices are stored in the memory devices of storage unit #0_0.

The method continues at step 106 from 104, where the first storage unit creates a new logical to physical mapping. For example, the first storage unit identifies a set of memory devices that is allocated DSN addresses of a previous portion of the logical address sub-space that is now part of the first portion of the logical address sub-spaces. In this example, the previous portion of the logical address sub-space was allocated among the memory devices; a first memory device was allocated a first part of the previous portion of the logical address sub-space; a last memory device was allocated a last part of the previous portion of the logical address sub-space, the set of memory devices includes one or more memory devices, but less than all of the memory devices, and includes either the first or the last memory device.

Continuing with the example, the first storage unit reorganizes the previous portion of the logical address sub-space to a new logical-to-physical storage mapping based on the second portion of the logical address sub-space. For instance, the first storage unit logically repositions the set of memory devices between other memory devices and transfers allocation of some DSN addresses of the other memory devices to the set of memory devices. The first storage unit also adjusts allocation of remaining DSN addresses of the second portion of the logical address sub-space among at least some remaining memory devices. An example of this was discussed with reference to FIG. 14.

At step 108, the second storage unit transfers a second group of encoded data slices to the new storage unit in accordance with the reorganized logical address sub-space. For example, storage unit #0_1 transfers encoded data slices with slice names having MSBs in the range of 000 10000 to 000 10100 to the new storage unit #0_2. Like the first storage unit, the second storage unit creates a new logical to physical mapping of DSN addresses to its memory devices at step 110. To accommodate the data transfer, the new storage unit allocates the first portion of the logical address sub-space (e.g., 000 01011 to 000 10100 of FIG. 13) among its memory devices and, as encoded data slices are received, storing them in accordance with the first logical-to-physical storage mapping.

At step 112, the other storage units transfer encoded data slices in accordance with the reorganized logical address sub-space. At step 114, the storage units create a new logical to physical mapping. This occurs each time a storage unit is added to a group of storage units. For example, and with reference to FIG. 16, each time a storage unit is added, the existing storage units transfer data to the new storage unit and transfer data to one another. As a specific example, when storage unit #0_4 is added, storage unit #0_0 transfers data having MSBs in the main section 000 of 6 and 7 (decimal) to SU #0_2 and SU #0_1 transfers data having MSBs in the main section 000 of 24 and 25 (decimal) to SU #0_3. Within SU #0_0 and SU #0_1, the allocation of logical addresses to the physical memory devices is updated.

Continuing with the example, SU #0_2 transfers data having MSBs in the main section 000 of 13-15 (decimal) to new SU #0_4 and SU #0_3 transfers data having MSBs in the main section 000 of 16-18 (decimal) to new SU #0_4. Within SU #0_2 and SU #0_2, the allocation of logical addresses to the physical memory devices is updated. Within SU #0_4 a logical address to physical memory device mapping is created.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   determining, by a managing unit of a dispersed storage network (DSN), an addition of a new storage unit to a group of storage units, wherein the DSN includes a logical address space that is divided into a set of logical address sub-spaces, wherein the group of storage units is allocated a logical address sub-space of the set of logical address sub-spaces, and the new storage unit and each storage unit in the group of storage units includes a plurality of memory devices;

reorganizing, by the managing unit, distribution of the logical address sub-space among the new storage unit and each storage unit in the group of storage units to produce a reorganized logical address sub-space, wherein allocation of a first portion of the logical address sub-space is allocated to the new storage unit, wherein the first portion of the logical address sub-space is between second and third portions of the logical address sub-space, wherein the second portion of the logical address sub-space is allocated to a first storage unit of the group of storage units and the third portion of the logical address sub-space is allocated to a second storage unit of the group of storage units;

transferring, by the first storage unit, a first group of encoded data slices to the new storage unit in accordance with the reorganized logical address sub-space;

transferring, by the second storage unit, a second group of encoded data slices to the new storage unit in accordance with the reorganized logical address sub-space;

determining, by the managing unit, an addition of a second new storage unit to a second group of storage units, wherein the second group of storage units is allocated a second logical address sub-space of the set of logical address sub-spaces;

reorganizing, by the managing unit, distribution of the second logical address sub-space among the second new storage unit and each storage unit in the second group of storage units to produce a reorganized second logical address sub-space, wherein allocation of a first portion of the second logical address sub-space is allocated to the second new storage unit, wherein the first portion of the second logical address sub-space is between second and third portions of the second logical address sub-space, wherein the second portion of the second logical address sub-space is allocated to a third storage unit of the second group of storage units and the third portion of the second logical address sub-space is allocated to a fourth storage unit of the second group of storage units;

transferring, by the third storage unit, a third group of encoded data slices to the second new storage unit in accordance with the reorganized second logical address sub-space; and transferring, by the fourth storage unit, a fourth group of encoded data slices to the second new storage unit in accordance with the reorganized second logical address sub-space.

2. The method of claim 1 further comprises:
allocating, by the new storage unit, the first portion of the logical address sub-space among the plurality of memory devices of the new storage unit to produce a first logical-to-physical storage mapping; and
as encoded data slices are received, storing, by the new storage unit, the encoded data slices in the plurality of memory devices of the new storage unit in accordance with the first logical-to-physical storage mapping.

3. The method of claim 1, wherein the transferring the first group of encoded data slices comprises:
determining, by the first storage unit, logical DSN addresses of a previous portion of the logical address sub-space that was allocated to the first storage unit that are being reallocated to the new storage unit based on a difference between the second portion of the logical address sub-space and the previous portion of the logical address sub-space; and identifying, by the first storage unit, the first group of encoded data slices as encoded data slices having slice names that correspond to the logical DSN addresses that are being reallocated.

4. The method of claim 3, wherein the identifying the first group of encoded data slices comprises:
accessing, by the first storage unit, a previous logical-to-physical storage mapping of the previous portion of the logical address sub-space to the plurality of memory devices of the first storage unit, wherein, in accordance with the previous logical-to-physical storage mapping, the first group of encoded data slices is stored in a set of memory devices of the plurality of memory devices, wherein the set of memory devices includes one or more memory devices, but less than all of the memory devices, of the plurality of memory devices of the first storage unit.

5. The method of claim 1 further comprises:
identifying, by the first storage unit, a set of memory devices of the plurality of memory devices of the first storage unit that is allocated DSN addresses of a previous portion of the logical address sub-space that are now part of the first portion of the logical address sub-spaces, wherein:
the previous portion of the logical address sub-space was allocated among the plurality of memory devices,
a first memory device of the plurality of memory devices was allocated a first part of the previous portion of the logical address sub-space,
a last memory device of the plurality of memory devices was allocated a last part of the previous portion of the logical address sub-space,
the set of memory devices includes one or more memory devices, but less than all of the memory devices, of the plurality of memory devices of the first storage unit, and
the set of memory devices includes either the first or the last memory device;
reorganizing, by the first storage unit, the previous portion of the logical address sub-space to a new logical-to-physical storage mapping based on the second portion of the logical address sub-space by:
logically repositioning the set of memory devices between other memory devices of the plurality of memory devices of the first storage unit; and
transferring allocation of some DSN addresses of the other memory devices to the set of memory devices.

6. The method of claim 5, wherein the reorganizing the previous portion of the logical address sub-space to the new logical-to-physical storage mapping further comprises:
adjusting allocation of remaining DSN addresses of the second portion of the logical address sub-space among at least some remaining memory devices of the plurality of memory devices of the first storage unit.

7. The method of claim 1 further comprises:
transferring, by at least one storage unit of the group of storage units, encoded data slices to another storage unit of the group of storage units in accordance with the reorganized logical address sub-space.

8. The method of claim 7, wherein the transferring encoded data slices from the at least one storage unit to the other storage units comprises at least one of:
transferring, by a first other storage unit of the at least one storage unit, at least one of the encoded data slices to the first storage unit in accordance with the reorganized logical address sub-space; and transferring, by a second other storage unit of the at least one storage unit, at least another one of the encoded data slices to the second storage unit in accordance with the reorganized logical address sub-space.

9. A computer readable memory device comprises:
a first memory section that stores operational instructions that, when executed by a managing unit of a dispersed storage network (DSN), causes the managing unit to:
   determine an addition of a new storage unit to a group of storage units, wherein the DSN includes a logical address space that is divided into a set of logical address sub-spaces, wherein the group of storage units is allocation a logical address sub-space of the set of logical address sub-spaces, and the new storage unit and each storage unit in the group of storage units includes a plurality of memory devices; and
   reorganize distribution of the logical address sub-space among the new storage unit and each storage unit in the group of storage units to produce a reorganized logical address sub-space, wherein allocation of a first portion of the logical address sub-space is allocated to the new storage unit, wherein the first portion of the logical address sub-space is between second and third portions of the logical address sub-space, wherein the second portion of the logical address sub-space is allocated to a first storage unit of the group of storage units and the third portion of the logical address sub-space is allocated to a second storage units of the group of storage units;
a second memory section that stores operational instructions that, when executed by the first storage unit, causes the first storage unit to:
   transfer a first group of encoded data slices to the new storage unit in accordance with the reorganized logical address sub-space; and
a third memory section that stores operational instructions that, when executed by the second storage unit, causes the second storage unit to:
   transfer a second group of encoded data slices to the new storage unit in accordance with the reorganized logical address sub-space;
a fourth memory section that stores operational instructions that, when executed by the managing unit, causes the managing unit to:
   determine an addition of a second new storage unit to a second group of storage units, wherein the second group of storage units is allocated a second logical address sub-space of the set of logical address sub-spaces; and
   reorganize distribution of the second logical address sub-space among the second new storage unit and each storage unit in the second group of storage units to produce a reorganized second logical address sub-space, wherein allocation of a first portion of the second logical address sub-space is allocated to the second new storage unit, wherein the first portion of the second logical address sub-space is between second and third portions of the second logical address sub-space, wherein the second portion of the second logical address sub-space is allocated to a third storage unit of the second group of storage units and the third portion of the second logical address sub-space is allocated to a fourth storage unit of the second group of storage units;
a fourth memory section that stores operational instructions that, when executed by the third storage unit, causes the third storage unit to:
   transfer a third group of encoded data slices to the second new storage unit in accordance with the reorganized second logical address sub-space; and
a fifth memory section that stores operational instructions that, when executed by the fourth storage unit, causes the fourth storage unit to:
   transfer a fourth group of encoded data slices to the second new storage unit in accordance with the reorganized second logical address sub-space.

10. The computer readable memory device of claim 9 further comprises:
a fourth memory section that stores operational instructions that, when executed by the new storage unit, causes the new storage unit to:
   allocate the first portion of the logical address sub-space among the plurality of memory devices of the new storage unit to produce a first logical-to-physical storage mapping; and
   as encoded data slices are received, store the encoded data slices in the plurality of memory devices of the new storage unit in accordance with the first logical-to-physical storage mapping.

11. The computer readable memory device of claim 9, wherein the second memory section further stores operational instructions that, when executed by the first storage unit, causes the first storage unit to transfer the first group of encoded data slices by:
   determining logical DSN addresses of a previous portion of the logical address sub-space that was allocated to the first storage unit that are being reallocated to the new storage unit based on a difference between the second portion of the logical address sub-space and the previous portion of the logical address sub-space; and
   identifying the first group of encoded data slices as encoded data slices having slice names that correspond to the logical DSN addresses that are being reallocated.

12. The computer readable memory device of claim 11, wherein the second memory section further stores operational instructions that, when executed by the first storage unit, causes the first storage unit to identify the first group of encoded data slices by:
   access a previous logical-to-physical storage mapping of the previous portion of the logical address sub-space to the plurality of memory devices of the first storage unit, wherein, in accordance with the previous logical-to-physical storage mapping, the first group of encoded data slices is stored in a set of memory devices of the plurality of memory devices, wherein the set of memory devices includes one or more memory devices, but less than all of the memory devices, of the plurality of memory devices of the first storage unit.

13. The computer readable memory device of claim 9, wherein the second memory section further stores operational instructions that, when executed by the first storage unit, causes the first storage unit to:
   identify a set of memory devices of the plurality of memory devices of the first storage unit that is allocated DSN addresses of a previous portion of the logical address sub-space that are now part of the first portion of the logical address sub-spaces, wherein:
      the previous portion of the logical address sub-space was allocated among the plurality of memory devices,
      a first memory device of the plurality of memory devices was allocated a first part of the previous portion of the logical address sub-space, a last memory device of the plurality of memory devices was allocated a last part of the previous portion of the logical address sub-space, the set of memory devices includes one or more memory devices, but less than all of the memory devices, of the plurality of memory devices of the first storage unit, and the set of memory devices includes either the first or the last memory device;

reorganize the previous portion of the logical address sub-space to a new logical-to-physical storage mapping based on the second portion of the logical address sub-space by:

logically repositioning the set of memory devices between other memory devices of the plurality of memory devices of the first storage unit; and transferring allocation of some DSN addresses of the other memory devices to the set of memory devices.

14. The computer readable memory device of claim 13, wherein the second memory section further stores operational instructions that, when executed by the first storage unit, causes the first storage unit to reorganize the previous portion of the logical address sub-space to the new logical-to-physical storage mapping further by:

adjusting allocation of remaining DSN addresses of the second portion of the logical address sub-space among at least some remaining memory devices of the plurality of memory devices of the first storage unit.

15. The computer readable memory device of claim 9 further comprises:

a fourth memory section that stores operational instructions that, when executed by at least one storage unit of the group of storage units, causes the at least one storage unit of the group of storage units to:

transfer encoded data slices to another storage unit of the group of storage units in accordance with the reorganized logical address sub-space.

16. The computer readable memory device of claim 15, wherein the further memory section further stores operational instructions that causes transferring of the encoded data slices from the at least one storage unit to the other storage units by at least one of:

transferring, by a first other storage unit of the at least one storage unit, at least one of the encoded data slices to the first storage unit in accordance with the reorganized logical address sub-space; and transferring, by a second other storage unit of the at least one storage unit, at least another one of the encoded data slices to the second storage unit in accordance with the reorganized logical address sub-space.

* * * * *